United States Patent [19]

Moring et al.

[11] 4,216,856
[45] Aug. 12, 1980

[54] REINFORCEMENT FOR ELASTOMERIC ARTICLES

[75] Inventors: Peter L. E. Moring, Sutton Coldfield; Ian Biggs, Birmingham, both of England

[73] Assignee: Dunlop Limited, London, England

[21] Appl. No.: 862,570

[22] Filed: Dec. 20, 1977

Related U.S. Application Data

[63] Continuation of Ser. No. 665,417, Mar. 10, 1976, abandoned.

[30] Foreign Application Priority Data

Apr. 25, 1975 [GB] United Kingdom ............... 17174/75

[51] Int. Cl.² .................. B65G 16/30; B32B 5/12
[52] U.S. Cl. .................. 198/847; 156/181; 428/109; 428/112; 428/113; 428/114; 428/295
[58] Field of Search ............... 428/109, 112, 113, 114, 428/295, 378, 394, 395, 396, 522; 198/847

[56] References Cited

U.S. PATENT DOCUMENTS

| | | | |
|---|---|---|---|
| 3,221,869 | 12/1965 | Paasche | 428/114 |
| 3,360,442 | 12/1967 | Desch | 428/247 |
| 3,649,433 | 3/1972 | Drout | 428/522 |
| 3,673,023 | 6/1972 | Ross | 428/114 |
| 3,756,905 | 9/1973 | Mills et al. | 428/114 |
| 3,793,130 | 2/1974 | Marzocchi | 428/295 |
| 3,900,627 | 8/1975 | Angioletti et al. | 428/114 |

Primary Examiner—William R. Dixon, Jr.
Attorney, Agent, or Firm—Stevens, Davis, Miller & Mosher

[57] ABSTRACT

A reinforcement strip for an elastomeric material article such as belting or hose comprising a multiplicity of mutually parallel substantially untwisted filaments which are impregnated such that substantially every filament is coated by a matrix material providing a peel strength between filaments of at least 3.15 KN/m. The matrix material may be a plastisol e.g. pvc (polyvinyl chloride) and dry bonding agents are preferably incorporated. Belting and a method of manufacture are included in the invention.

48 Claims, 5 Drawing Figures

REINFORCEMENT FOR ELASTOMERIC ARTICLES

This is a Continuation of application Ser. No. 665,417 filed Mar. 10, 1976 now abandoned.

This invention relates to reinforcement of elastomeric articles and in particular to a strip reinforcement for use in elongated articles such as belting and hose.

It is known to provide for longitudinal strength in a strip by means of a multiplicity of substantially parallel filaments embedded in elastomer. To provide sufficient strength for the article it has previously been necessary to group the filaments into discrete groups or yarns and to space apart the groups across the sheet.

In the case of belting it is conventional to use reinforcement layers or plies of woven textile fabric the plies being separated by layers of rubber or PVC (polyvinyl chloride). The resultant reinforcement structure is of substantial thickness due to the number of plies required but the crimp in the woven plies allows the absorption of compressive strain in the radially inner reinforcement plies when the belting is passed around end rollers. Thus crimp is essential in such belting but crimp has an unwanted effect on the longitudinal belting modulus as tensile forces cause straightening of the crimped yarns as well as stretching.

The requirements of transverse strength and stiffness are related to the troughability and load support of a belt, these functions are related to the extensibility, weave of the fabrics and number of plies used in the construction of the belt and will vary according to the width of the belt. Furthermore the transverse stiffness is required to be predictable and consistent to allow satisfactory use of the belting in a troughed configuration.

High modulus belting uses steel cords or cables spaced apart across the width of the belt and extending longitudinally of the belt. This construction allows for satisfactory load support and troughability. The cables provide discrete groups of filaments but in belting make difficulties in the reliable attachment of fasteners.

The Applicants have discovered that it is possible to form a useful reinforcement strip without grouping the filaments into discrete groups and one object of the present invention is to provide such a strip.

Another object, specifically relating to belting, is to provide conveyor belting in which the reinforcement strip provides a comparatively thin reinforcement layer which uses the reinforcement material efficiently and allows economic manufacture of belting.

According to one aspect of the present invention a reinforcement strip for reinforcing an elastomeric material article comprises a multiplicity of closely-packed mutually parallel filaments which are impregnated such that substantially every filament is coated by a matrix material providing a peel adhesion of at least 3.15 KN/m when tested as defined herein.

The peel adhesion is tested according to British Standard B.S. 490: Part I: 1972 by means of pulling apart two reinforcement strips. Peeling may occur between the two strips or within either strip and thus is a measure of the peel adhesion of the matrix material.

Preferably the peel adhesion is greater than 5.0 KN/m.

Preferably the matrix material has a tear strength greater than 100 N/standard test piece when tested according to British Standard B.S. 903: Part A3: 1972. It should be noted that this tear strength is equivalent to a minimum tensile strength of 10 MN/m$^2$ when tested according to British Standard B.S. 903: Part A2: 1971. More preferably the tear strength is greater than 130 N/standard test piece which is equivalent to a tensile strength of 12 MN/m$^2$.

Furthermore the matrix material preferably has a modulus greater than 4 MN/m$^2$ when measured at 100% and greater than 8 MN/m$^2$ when measured at 200% the modulus being tested according to British Standard 903: Part A2: 1971. More preferably the modulus of the material is greater than 8 MN/m$^2$ at 100% and 12 MN/m$^2$ at 200%.

Preferably the filaments are substantially untwisted filaments.

The ratio between the area of the material and the area of the filaments comprising the reinforcement strip when taken in a transverse cross-section of the strip is preferably less than 3.0. Furthermore the ratio may in addition be greater than 1.0.

A preferred matrix material is a plastisol having bonding agents incorporated therein. The plastisol may be PVC (polyvinyl chloride).

Preferably when ungelled the PVC (polyvinyl chloride) matrix material has a viscosity before impregnation less than 20,000 centipoise as measured by a Brookfield Viscometer at 50 r.p.m. with a No. 7 spindle. A viscosity in the range 3000–6000 centipoise is still more preferable. Such viscosities enable effective impregnation to be obtained. It is known that such viscosities may be achieved in the case of plastisols by increasing the quantity of plasticizer but hitherto such changes have been accompanied by corresponding reductions in tensile strength and tear strength of the gelled plastisol. Typical effects are as follows:

| Plasticizer content (pphp) | 45 | 55 | 65 |
|---|---|---|---|
| Viscosity (cP) | 52,400 | 14,100 | 5600 |
| Tear strength (N/test piece) | 205 | 162 | 134 |
| Tensile strength (MN/m$^2$) | 18.8 | 18.1 | 15.8 |

Another aspect of the present invention provides a plastisol matrix material for belting having a viscosity suitably reduced by the inclusion of for example between 1 and 5 p.p.h.p. of a viscosity depressant and in addition a relatively small proportion of a monomeric plasticizer which can be cross-linked during subsequent heat treatment. Suitable viscosity depressants include alkyl aryl polyethers (such as Triton X 45 Trade Mark of Rohm & Haas) and suitable monomeric plasticizers include acrylates or esters of allyl alcohol which may be cross-linked by an included peroxide (such as Dicumyl peroxide). In preferred plastisols having low viscosity and high tensile and tear properties, the total plasticizer level is in the range of 40–70 parts per hundred of polymer, with 0–35 parts per hundred of polymer in the form of the monomeric cross-linkable variety.

To provide the bond strength to give the stated peel strengths it is preferred to use bonding agents such as those resin precursors which react to form an aldehyde condensation resin. Typical precursors are aromatic hydroxy compounds and compounds that generate methylene groups on heating. Preferred bonding agents are resorcinol plus hexamethylene tetramine (HMT). The quantity of resorcinol for nylon filaments is preferably in the range 1.0–12.0 pphp though more preferably in the range 3.0–9.0 pphp. Suitable HMT quantities are 1.0–8.0 pphp with a preferred range of 1.5–5.0 pphp.

Many different filament materials may be used in addition to nylon disclosed above such as for example aliphatic and aromatic polyamides in general including those sold as Nomex and Kevlar, polyesters, polyvinyl derivatives, polyolefin derivatives, rayon, glass and metals and these may be in either continuous filament or staple fibre form. The materials are preferably used in the linearly anisotropic form (e.g. drawn polyamide filaments).

Since, in accordance with the invention, there are a substantial number of filaments superimposed upon one another in the depth of the reinforcement strip, there is an inherent compliance or cushioning in the strip enabling the filaments to lie flat in the impregnated strip. The resultant substantially smooth strip surfaces greatly facilitate belting assembly as it precludes air entrapment.

Yet further aspects of the invention provide belting having covers, i.e. outer surface layers, of extruded spread or calendered PVC belting having PVC (polyvinyl chloride)/nitrile rubber (acrylonitrile-butadiene-styrene rubber) mix covers and belting having rubber and other elastomeric material covers.

In the first case the PVC covers are self-bonding to the PVC (polyvinyl chloride) impregnated reinforcement strip assembly but in the case of rubber covers a priming treatment may if necessary be used to ensure adequate bonding of the covers.

The invention also includes providing different numbers of reinforcement filaments in the strip reinforcement. Thus the strip may be of any required longitudinal strength rating. Furthermore, two or more strips may be joined side-by-side either by a butt join or an overlapping edge joint to form different widths of reinforcement for different widths of belting.

More than one reinforcement ply may be utilised and the use of two or more longitudinal reinforcement plies allows belting of high strength to be formed without having to manufacture an excessively thick reinforcement strip. Furthermore, one or more plies of strip reinforcement may be included having the filaments running transversely of the belting to provide for control of the transverse strength and flexibility of the belting. The transverse layers may be perpendicular to the length of the belting or at any angle thereto. Angles in the range of 45° to 75° are useful and in particular 60°. Preferably a balanced structure is used with equal numbers of plies biased to either side of the length of the belting.

Various combinations of layers are included, for example:
(a) one or more layers of longitudinally reinforced sheet having one or more layers of transversely reinforced sheet attached to one side.
(b) two or more layers of longitudinally reinforced sheet are separated from each other by one or more layers of transversely reinforced sheet.
(c) one or more longitudinally reinforced sheets form the centre of the laminate and have one or more transversely reinforced sheets attached to each side.
(d) one or more transversely reinforced sheets form the centre of the laminate and have one or more longitudinally reinforced sheets attached to each side.

The non-woven thin nature of the textile reinforcement allows for localised additional reinforcement and the placing of reinforcement breakers, stepped plies and reverse stepped plies together with rip stops which were well known in the art when cotton reinforced and mixture belting was universally manufactured. Present designs have reduced the need for such constructions but this invention allows, for example, the possibility of the use of stepped plies in a belt construction economically and efficiently to modify the lateral rigidity and hence the flexibility for troughing across the width of a belt.

In order to optimise the belting properties and in particular to provide good fastened hold and peel strength the layers may be spaced-apart by means of a thin interlayer.

The interlayer may be of the same material as the covers but is preferably a nitrile rubber compound or more preferably the matrix material. In the latter case the interlayer may be a separate sheet of specially formulated matrix material or may be formed integral with the reinforcement strip by means of a high pick-up of matrix material, on one or both sides of the assembled filaments. Conveniently a thickened matrix layer is formed on one side only such that the strip may be used either way up dependent on the precise requirements of interlayer or no interlayer between particular layers of reinforcement strip in a belt.

The invention also provides a method of impregnating or encapsulating reinforcement filaments to form a reinforcement strip as described together with a method of assembling belting.

According to another aspect of the present invention a method of impregnating a reinforcement strip as described above comprises bringing together the required number of filaments to form a sheet, passing them downwardly through matrix material and the nip of a pair of converging coating members and solidifying the strip of material. The solidification step may be gelling, drying or polymerising dependent on the matrix material shown. The converging coating member is preferably curved and may comprise a pair of cylindrical sections. The impregnated sheet may be taken over a heated roller after the converging guides to effect solidification.

According to another aspect of the invention an apparatus for impregnating reinforcement strip as described comprises a pair of horizontal, parallel stationery converging coating members, end seals to form an open-topped trough for matrix material, guide means for guiding the required sheet of filaments downwardly between the coating members, means for solidifying the impregnated strip of material and take-up means.

Further aspects of the invention will be made apparent by way of example only from the following description of several embodiments of the invention read in conjunction with the drawings in which.

Figure 1:
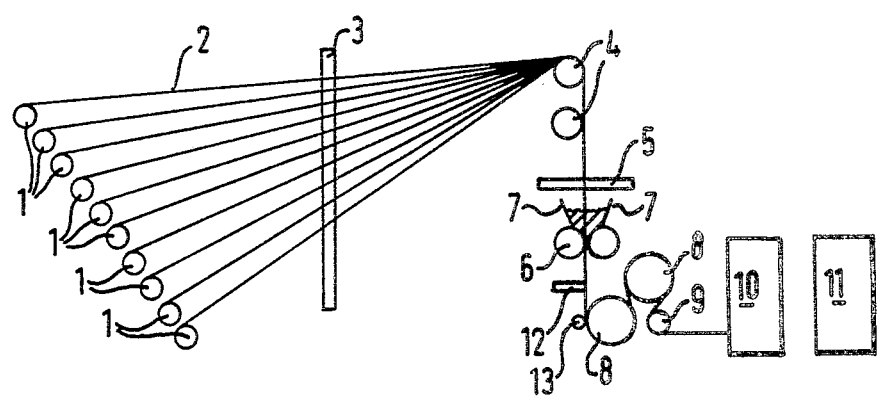
FIG. 1 shows an apparatus for impregnating the reinforcement strip of the present invention.
Figure 2:
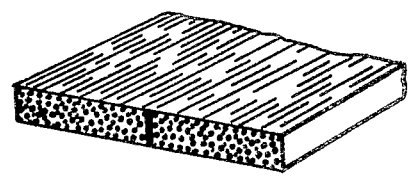
FIG. 2 shows a reinforcement strip having a multiplicity of filaments impregnated with matrix material.

In a first embodiment of the invention a reinforcement strip or sheet as shown in FIG. 2 was formed by bringing together, at an end spacing of 276 yarns per 100 mm of 94 tex nylon yarns each comprising 140 filaments. The assembly was encapsulated in the apparatus of FIG. 1 with a PVC (polyvinyl chloride) plastisol formulation 1 of 5600 cP viscosity followed by a gelling stage at 170° C. for 25 seconds which completed penetration through the assembled filamentary structure and hardened the sheet. (Further details of the encapsulation method and apparatus will be described later).

A second sheet was made in precisely the same manner using a PVC (polyvinyl chloride) plastisol formulation 2 without the adhesion promotors.

Figure 3:
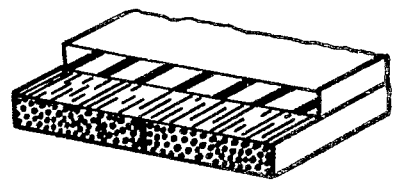
FIG. 3 shows the strip of FIG. 2 with an attached layer of elastomer.

Peel adhesion of each sheet was then tested according to B.S. 490: Part I: 1972 measuring the mean force to separate a laminate of two encapsulated filament sheets. The laminate was backed with a rubber cover as shown in FIG. 3 and cured for 15 minutes at 160° C. to simulate a belt.

The PVC formulations and peel adhesion results are as follows:

|  | Formulation 1 | Formulation 2 |
| --- | --- | --- |
| PVC (polyvinyl chloride) | 100 | 100 |
| Dioctyl phthalate | 65 | 65 |
| Tribase | 5 | 5 |
| Resorcinol | 5 | — |
| Hexamethylene tetramine | 3 | — |
| Peel adhesion (KN/m) | 3.4 | 0.5 |

The peel adhesion results demonstrate the importance of ensuring a high level of fibre/matrix bonding by adding suitable bonding agents to the matrix mix.

Figure 4:
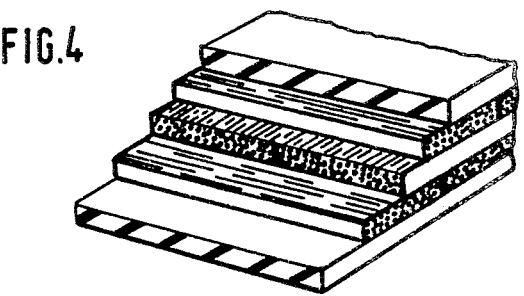
FIG. 4 is a stepwise section piece of belting comprising outer covers of rubber, a central longitudinally extending reinforcement layer and on either side of the longitudinally extending reinforcement layer a layer of transversely extending reinforcement filaments.

A complete conveyor belt of 8 mm thickness was built to standard 315 KN/m strength specification, i.e. required longitudinal strength of 350 KN/m and required transverse strength of 130 KN/m. The belting is shown in FIG. 4.

A longitudinal reinforcing sheet, 1050 mm wide, was produced by assembling 2898 ends of 94 tex nylon tyre yarn (140 filaments per yarn) which therefore provided in total 405,720 filaments of 0.67 tex into a sheet of regular end spacing and encapsulating the assembled filaments with a PVC plastisol to a level of 300% based on yarn weight (i.e. a matrix material to reinforcement ratio of 2.4 based on cross-sectional area.

The following PVC (polyvinyl chloride) plastisol formulation was used:

| Norvinyl P 10 (Trade Mark of the Norsk-Hydro Co.) | 100 |
| --- | --- |
| Diisoctyl phthalate | 45 |
| Diallyl phthalate | 10 |
| Dicumyl peroxide | 1 |
| Tribasic lead sulphate | 5 |
| Resorcinol | 7.5 |
| Hexamethylene tetramine | 4.5 |
| Triton × 45 (Trade Mark of Rohm & Haas) | 2 |

The encapsulation treatment was carried out by passing the filaments in a downward direction through the nip of two stationery rollers containing the plastisol and onto FEP-coated, internally-heated, rotating rollers for a gelling treatment of 25 seconds at 170° C. (Further details of the encapsulation will be given later).

A transverse reinforcing sheet 1050 mm wide was prepared by assembling 966 ends of 94 tex nylon tyre yarn (140 filaments per yarn) i.e. a total of 135,240 filaments from 3 yarn beams into a sheet of regular spacing and encapsulating this assembly with the same plastisol formulation as above, also to a level of 300% of yarn weight (i.e. a matrix material to reinforcement ratio in cross-section of 2.4). After spraying Chemlok 220 (Trade Mark of the Hughson Chemical Co.) onto the sides with the lower matrix pick-up, (i.e. the side in contact with the first heated roller), the transverse sheet was cut into lengths, these were turned through 90°, and their Chemlok-treated surfaces were rolled against two rubber covers in an abutting arrangement to form two layers of transverse reinforcement. The two rubber covers were 2 mm and 4 mm thick respectively.

In order to optimise interply peel adhesion in the centre of the belt, two longitudinal reinforcing sheets were assembled with the sides having higher matrix pick-up facing inwards (i.e. the sides furthest from the first gelling roller). The rubber covers with the transverse reinforcement attached were placed one on either side of the two longitudinal reinforcing sheets to form a laminate of (cover/1 transverse sheet/2 longitudinal sheets/1 transverse sheet/cover) assembly which was then cured in a belting press for 15 minutes at 160° C. At the end of the cure cycle, the belt was cooled in the press for 2 minutes and after removal from the press it was trimmed to its final width of 1 meter.

The belt was tested and the results compared with those of conventionally reinforced belting:

|  | Reinforced Belt according to the invention | Conventional Fabric Reinforced Belt |
| --- | --- | --- |
| Strength efficiency of belt based on yarn strength (%) | 94 | 78 |
| Peel adhesion according to BS 490 (KN/m) | | |
| Ply to Ply | 6.25 | 7.0 |
| Cover to ply | 12+ | 12+ |
| Strength loss after flexing for 50 hours (%) | 0 | 0 |
| Static fastener efficiency based on belt strength (%) (Dunlop Champion fasteners) | 64 | 62 |
| Dynamic fastener performance (hours to failure) | 130+ | 40-100 |
| Troughability according to B.S. 490 | 0.19 | 0.30 |

The resultant high strength efficiency of the new belting is due at least in part to the non-woven structure of the fibre-film reinforcement, the high degree of encapsulation, and the high level of fibre matrix bonding.

Furthermore the reinforcement structure or carcase of the belting is thin when compared with conventional textile reinforced belting which allows good longitudinal and transverse flexibility and fatigue life by not subjecting the reinforcement filaments to any substantial compression.

Two further belting examples were made each containing three layers of 1050 mm wide longitudinal reinforcing sheet, consisting of 2898 ends of 94 tex nylon tyre yarn (140 filaments per yarn) encapsulated with a PVC (polyvinyl chloride) plastisol to a level of 250%, and 4 layers of 1050 mm wide transverse reinforcing sheet, each consisting of 1449 ends of 94 tex nylon tyre yarn (140 filaments per yarn) encapsulated with a PVC (polyvinyl chloride) plastisol to a level of 300%. Both belts were constructed in the following order: Bottom rubber cover, Chemlok 220 layer; two layers of transverse reinforcing sheet, one layer of longitudinal reinforcing sheet, two layers of transverse reinforcing sheet, two layers of longitudinal reinforcing sheet, Chemlok 220 layer, top rubber cover.

Figure 5:
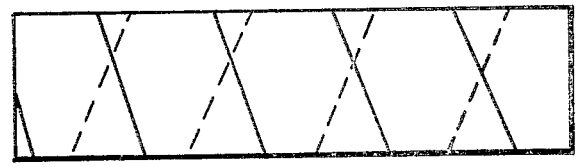
FIG. 5 shows a transverse reinforcement strip laid at a bias angle of 60° relative to the longitudinal centre line of the belting.

In one belt all the transverse layers were arranged at 90° to the longitudinal layers, but in the other belt as shown in FIG. 5 the two transverse layers of both sets were arranged at opposite bias angle of ±60° to the longitudinal direction.

The test results below show that a biassed weft construction improved the troughability.

| Angle of Transverse Reinforcement | Troughability at | | | |
|---|---|---|---|---|
| | 24° C. | | −10° C. | |
| | F/L | Angle | F/L | Angle |
| 90 | 0.140 | 40° | 0.076 | 26° |
| 60 | 0.212 | 52° | 0.115 | 36° |

The troughability was measured according to B.S. 490 Part I: 1972 and this F/L ratio is a measure of the troughability and the angle is the resultant troughing angle (L as tested=650 mm).

Belting for low temperature applications may be made with only slight changes to the PVC matrix material formulation. The changes are to use any of the well-known low temperature plasticizers for example esters of linear acids and linear alcohols e.g. "PLIA-BRAC" 985 (Trade Mark of Albright & Wilson) which is an ester of saturated $C_4$–$C_6$ dibasic acids and higher normal alcohols.

Flame resistant belting may be made by other modifications to the materials used such as for example using a phthalate plasticizer or flame resistant additives.

Furthermore the belting of the present invention may be of low strength such as is used for food belting and package handling belting. Such light tension applications are met by simple reinforcement structure arrangements (e.g. one or two longitudinal sheets only) and the PVC matrix material may be used to provide the belt surfaces so that covers need not be used.

FIG. 1 shows the apparatus used for impregnating the filaments to form the yarn strip or sheet. A series of beams 1 each carrying a set of yarn ends are mounted in a rack so that the ends may all be taken off in an array 2. A condensing reed arrangement 3 sets the position of each yarn in the array 2 and the yarns are then formed into two sheets which are passed one over each of a pair of guide rollers 4. The two sheets are brought together, fed through a final spacing reed 5 to assemble the yarns as required in the final strip and are passed into the impregnation head.

The impregnation head comprises a pair of coating members 6 which are stationary rollers, a pair of side plates 7 and end plates (not shown) to form a trough which is kept full of the matrix material.

The strip or sheet of yarns is drawn downwardly through the trough of matrix material and the nip of the coating members 6. On leaving the impregnation head the strip is passed over a pair of internally heated gelling rollers 8 which are coated with a non-stick surface such as fluorinated ethylene/propylene. The strip is gelled with the filaments in the positions set by the spacing reed 5.

The strip is taken over a guide roller 9 through a haul-off unit 10 and to a batch-up 11. The haul-off unit draws the yarn strip through the apparatus from the beams which are lightly braked to maintain an even filament tension and thus provide uniformity in fibre distribution. The spacing reed 5 and the condenser reed 3 are arranged to space the yarns so that an even filament distribution is obtained in the strip.

Uniformity in filament distribution within the impregnated strip is assisted, particularly in the case of reinforcing strip having both a low fibre and a low matrix content, by the addition of a spreader bar 12 inserted between the coating members 6 and the gelling rollers 8. The spreader bar 12 is held in contact with one side of the strip.

The free movement of the yarn sheet through the impregnation head causes the matrix material to be forced into the assembly of filaments thereby excluding air without relatively displacing the filaments.

When using higher viscosity matrix materials the level of impregnation may be increased by heating the material in the trough either before putting it in the trough or by, for example, using heated coating members. A temperature just below the threshold set temperature e.g. 45° C. is suitable for PVC matrix materials.

The amount of matrix material is controlled by the nip setting of the coating members 6 (i.e. the gap between them). Typical settings are in the range of 0.1–1.0 mm. Such gaps require the use of knotless yarns or air spliced yarns. However, knotted yarns may be used if the coating members 6 have a resilient surface such as for example nitrile rubber in the region of the nip.

Surface regularity of the impregnated yarn sheet is controlled at the gelling stage. The gelling rollers have a non-stick surface of low porosity such as is obtained by fitting a sleeve of extruded fluorinated ethylene/propylene so as not to trap degraded PVC or bonding resin contained in the matrix material. Furthermore the slight ridging caused on the side not in contact with the first gel roller 8 is partly levelled by the second gel roller 8 but may be completely removed by using an additional roller 13 as a levelling roller which contacts the other side of the sheet immediately after it contacts the first gel roller 8.

As an alternative to the additional levelling roller 13 a saddle may be used which comprises a short non-stick band around two spaced-apart end rollers and held in contact with the outer surface of the strip for part of the path around the first gelling roller 8. The strip is thus held between a pair of surfaces, one the roller and the other end band surface, while initial gelling occurs and the resultant strip has very smooth upper and lower surfaces.

Lease bars may be used prior to passing the filaments through the trough to achieve regular distribution of filaments, when operating from creels at low tension.

Finally the coating members, gelling rollers and filament haul-off tension may be set to form a sheet having a thicker layer of matrix material on one side than on the other side.

Having now described our invention—what we claim is:

1. A conveyor belt reinforced by a reinforcement strip comprising a multiplicity of closely-packed mutually parallel filaments extending in the direction of the length of the conveyor belt, said filaments being arranged in a two-dimensional array and embedded in a matrix of flexible polymeric material which coats and bonds to substantially each individual filament and provides a peel-adhesion of at least 3.15 KN/m when tested as defined herein, said matrix of flexible polymeric material prior to coating and bonding to said filaments having a viscosity of less than 20,000 centipoises measured as defined herein and a tensile strength of at least 10 MN/m² in the assembled strip.

2. A conveyor belt according to claim 1 wherein the peel adhesion is greater than 5.0 KN/m.

3. A conveyor belt according to claim 1 wherein the matrix material has a tensile strength greater than 10 MN/m², when tested as defined herein.

4. A conveyor belt according to claim 1 wherein the matrix material has a modulus greater than 4 MN/m² measured at 100% and greater than 8 MN/m² measured at 200% when tested as defined herein.

5. A conveyor belt according to claim 1 wherein the matrix material has a modulus greater than 8 MN/m² measured at 100% and greater than 12 MN/m² measured at 200% when tested as herein defined.

6. A conveyor belt according to claim 1 wherein the ratio between the area of the matrix material and the area of the filaments comprising the reinforcement when taken in a transverse cross-section of the strip is less than 3.0.

7. A conveyor belt according to claim 6 wherein the ratio is greater than 1.0.

8. A conveyor belt according to claim 1 wherein the matrix material is a plastisol having resin precursors which react to form an aldehyde condensation resin incorporated therein.

9. A conveyor belt according to claim 8 wherein the plastisol is polyvinyl chloride.

10. A conveyor belt according to claim 9 wherein the matrix material includes acrylonitrile-butadiene-styrene rubber.

11. A conveyor belt according to claim 8 wherein the resin precursors are an aromatic hydroxy compound and a compound which generates methylene groups in heating.

12. A conveyor belt according to claim 11 wherein the precursor agents are resorcinol and hexamethylene tetramine.

13. A conveyor belt according to claim 8 wherein the total plasticiser content is in the range of 40–70 parts per hundred of polymer and less than 35 parts of the said polymer is in the form of a monomeric cross-linkable variety.

14. A conveyor belt according to claim 1 wherein the matrix material immediately prior to impregnating the filaments has a viscosity in the range of 3,000–6,000 centipoises measured as defined herein.

15. A conveyor belt according to claim 1 wherein the matrix material is a plastisol and the required viscosity is obtained by including between 1 and 5 parts per hundred parts of a viscosity depressant.

16. A conveyor belt according to claim 15 wherein the viscosity depressant in an alkyl aryl polyether.

17. A conveyor belt according to claim 15 wherein a monomeric plasticiser which cross links during heat treatment of the sheet is included.

18. A conveyor belt according to claim 17 wherein the monomeric cross-linkable plasticiser is an acrylate or ester of allyl alcohol.

19. A conveyor belt according to claim 1 wherein the filaments comprise continuous filaments.

20. A conveyor belt according to claim 1 wherein the filaments comprise staple fibres.

21. A conveyor belt according to claim 1 wherein the filaments are substantially untwisted.

22. A conveyor belt according to claim 1 wherein the filament material is drawn.

23. A conveyor belt according to claim 22 wherein the filaments comprise an aliphatic polyamide.

24. A conveyor belt according to claim 23 wherein the filaments are nylon, the matrix material is polyvinyl chloride and the bonding agents comprise between 3.0–9.0 parts per hundred of polymer of resorcinal and 1.5–4.0 parts per hundred of polymer of hexamethylene tetramine.

25. A conveyor belt according to claim 22 wherein the filaments comprise an aromatic polyamide.

26. A conveyor belt according to claim 22 wherein the filaments are chosen from the group of reinforcement materials comprising polyesters, polyvinyl derivatives, polyolefin derivatives, rayon, glass and metals.

27. A conveyor belt according to claim 1 wherein a layer of elastomeric material is attached to one side of the strip.

28. A conveyor belt according to claim 27 wherein the elastomeric material is rubber.

29. A conveyor belt according to claim 27 wherein a primer is used to assist in bonding to the elastomer.

30. A conveyor belt according to claim 1 wherein the reinforcement strip is the width of said belt.

31. A conveyor belt according to claim 30 wherein two or more longitudinal reinforcing strips are provided.

32. A conveyor belt according to claim 31 wherein the reinforcing strips are adjacent to one another.

33. A conveyor belt according to claim 31 wherein the reinforcing strips are separated by an interlayer ply of elastomer.

34. A conveyor belt according to claim 30 wherein an outer cover layer of elastomeric material is applied to one side of the belt.

35. A conveyor belt according to claim 34 wherein an outer cover layer is also applied to the other side of the belt.

36. A conveyor belt according to claim 34 wherein the cover material is PVC.

37. A conveyor belt according to claim 34 wherein the cover material is natural rubber.

38. A conveyor belt according to claim 34 wherein the cover material is polyvinyl chloride and nitrile rubber.

39. A conveyor belt according to claim 34 wherein the cover material is nitrile rubber.

40. A conveyor belt according to claim 1 wherein at least two strips are provided in edge-to-edge relation and each strip extends longitudinally of said belt to form a reinforcing ply.

41. A conveyor belt according to claim 1 wherein there is provided a transverse ply comprising a reinforcement strip corresponding to that recited in claim 1 and arranged with the filaments extending transversely of the belt.

42. A conveyor belt according to claim 41 wherein two or more transverse plies are provided.

43. A conveyor belt according to claim 42 wherein the transverse plies are spaced-apart in the thickness of the belt.

44. A conveyor belt according to claim 43 wherein the transverse plies are separated by the longitudinal reinforcement strip.

45. A conveyor belt according to claim 41 wherein the filaments of a transverse ply are substantially perpendicular to the length of the belt.

46. A conveyor belt according to claim 41 wherein the filaments of a transverse ply subtend angles of between 45° and 75° to the length of the belt.

47. A conveyor belt according to claim 46 wherein the filaments of a transverse ply are at 60° to the length of the belt.

48. A conveyor belt according to claim 46 wherein two or more transverse plies are provided laid at opposite bias angles to the length of the belt to provide a balanced construction.

* * * * *